United States Patent [19]

Laskey

[11] Patent Number: 4,819,168
[45] Date of Patent: Apr. 4, 1989

[54] TRAIN CONTROL HAVING IMPROVED WHEEL WEAR ADJUSTMENT FOR MORE ACCURATE TRAIN OPERATION

[75] Inventor: Paul S. Laskey, Baldwin Boro, Pa.

[73] Assignee: AEG Westinghouse Transportation Systems, Inc., Pittsburgh, Pa.

[21] Appl. No.: 145,175

[22] Filed: Jan. 19, 1988

[51] Int. Cl.⁴ ............................................. G06F 15/14
[52] U.S. Cl. ........................... 364/424.01; 364/426.02; 364/426.03; 180/197
[58] Field of Search ................................ 364/424, 426; 246/182 R, 182 A, 182 B, 182 C; 180/197

[56] References Cited

U.S. PATENT DOCUMENTS 4,347,569 8/1982 Allen, Jr. et al. .................... 364/426
4,709,194 11/1987 Yagi et al. ......................... 364/426 X

*Primary Examiner*—Eugene R. LaRoche
*Assistant Examiner*—David Mis
*Attorney, Agent, or Firm*—Spencer & Frank

[57] ABSTRACT

A microprocessor control system is provided for a steel wheel vehicle having at least two propulsion/braking units. Each unit operates a truck having a pair of axles each with two steel wheels. A propulsion/braking control includes a microprocessor that applies current commands to respective chopper controls that operate the axle motor drives. Braking command signals operate the associated braking system to apply dynamic and/or friction braking in the braking mode.

16 Claims, 13 Drawing Sheets

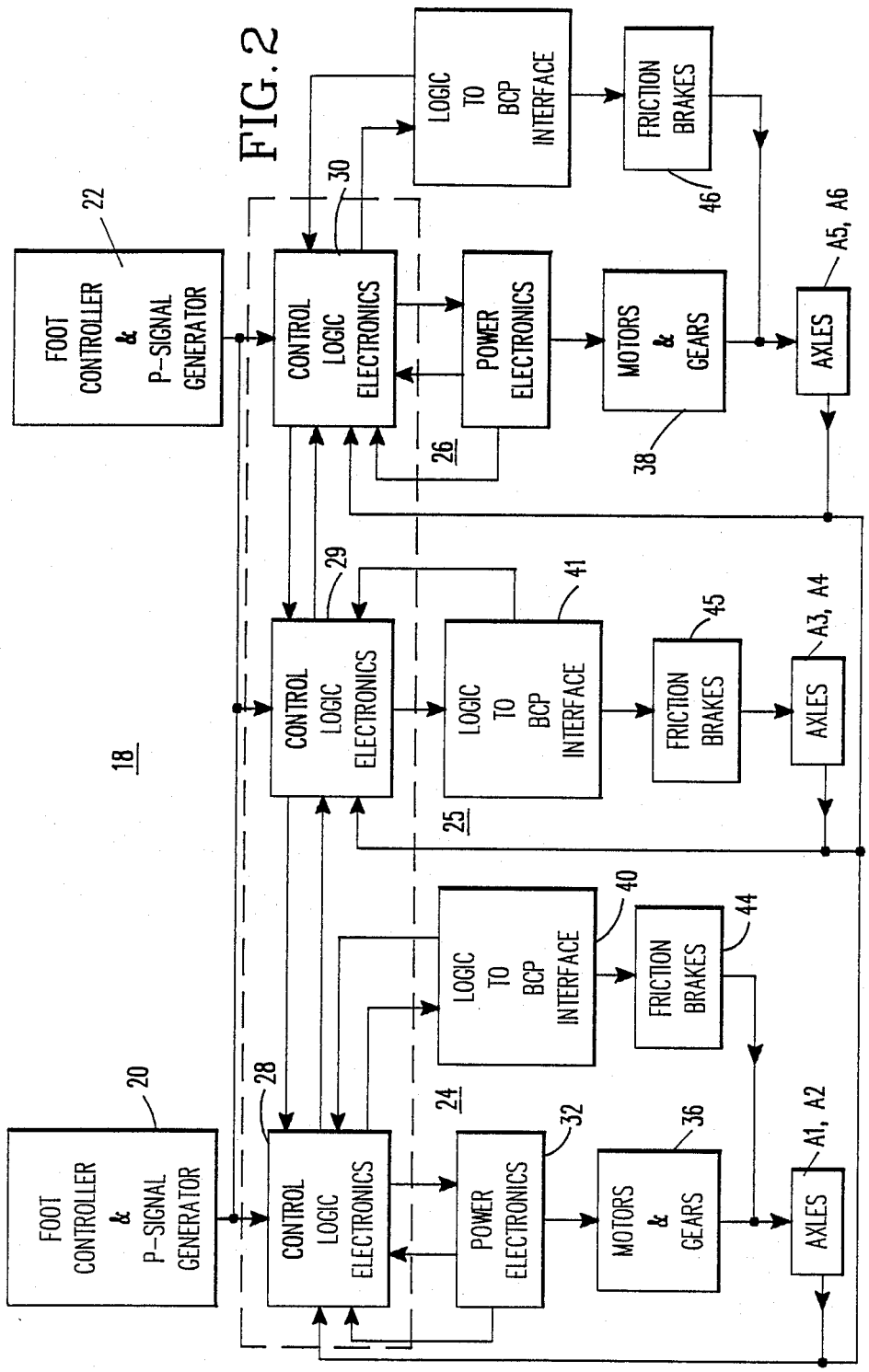

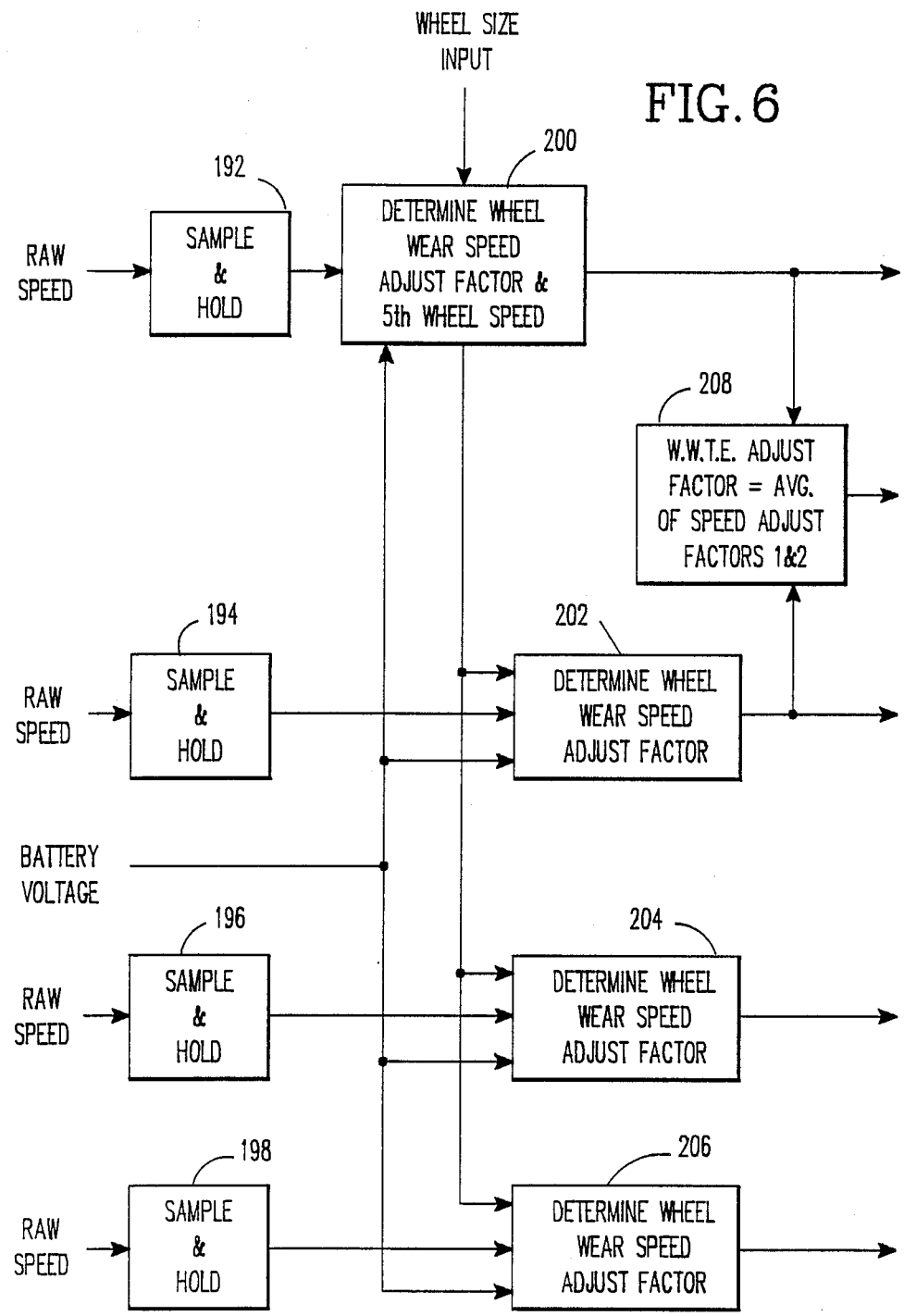

TRAIN CONTROL HAVING IMPROVED WHEEL WEAR ADJUSTMENT FOR MORE ACCURATE TRAIN OPERATION

BACKGROUND OF THE INVENTION

In the operation of steel wheeled transit vehicles in light rail or heavy rail systems, the wear of wheels with time can significantly affect the accuracy and efficiency with which vehicle operation can be controlled.

Thus, in comparing the speeds of axles for spin/slide control, compensation is required for any difference in the sizes of the wheels. Further, since the ratio of axle speed to vehicle speed changes as wheel size changes, it is preferred that the axle speeds be adjusted so that the axle speeds indicate the vehicle speed.

Wheel size changes also relate to tractive effort control. As wheel size decreases, less tractive effort is required to achieve a particular acceleration rate. Tractive effort adjustment for wheel size changes allows tight tolerances on acceleration and deceleration rates regardless of wheel size. By eliminating excessive tractive effort through control adjustment the frequency of spins and slides is reduced as the wheels wear.

In the prior art, one typical approach employed to address the wheel wear problem involves the automated sampling of car axle speeds under vehicle coasting conditions and automatically computing wheel wear compensation factors relating each axle speed to the speed of a preselected axle speed. The compensation factors are then employed in velocity difference calculations used to detect spins of slides.

The value of this prior art approach to wheel wear compensation is limited by the fact that it only compensates for relative wheel wear between axles because it employs the speed of one axle as a floating reference. Thus, relative wheel wear compensation is useful only in velocity difference calculations in spin-slide control and has no utility in making tractive effort compensation in normal power or braking control. Further, relative wheel wear compensation has no utility in the conversion of rotational speed to linear speed in linear speed monitoring and control.

In the prior art, absolute wheel wear compensation has been achieved for tractive effort compensation and linear speed monitoring and control by periodically measuring actual individual wheel sizes and entering the individual wheel sizes into each controller included in the vehicular control system. This procedure is time consuming and it is error prone because each wheel size must be entered in correspondence to the speed input for its axle.

Accordingly there has been a continuing need for highly automated, absolute wheel wear compensation so as to achieve improved accuracy and efficiency in vehicle operation.

SUMMARY OF THE INVENTION

An improved control system is provided for a steel wheel vehicle having at least two propulsion/braking units with each unit operative with at least one axle. The system comprises a propulsion/braking control that generates current signals to operate the axle motor drives and generates braking signals to operate the associated braking system in accordance with command signals.

A spin/slide control adjusts the propulsion/braking control in accordance with differential axle speeds to avoid vehicular spins/slides. Means are provided for generating a signal representative of the speed of each axle and for generating a signal representative of an entered actual wheel size for a preselected axle.

Speed adjust factors are computed for the respective axles from the entered actual wheel size, the base wheel sizes and the axle speeds. Means are provided for adjusting the respective axle speeds in accordance with the speed adjust factors and for applying the adjusted axle speeds to the spin/slide control for computation of differential axle speeds with wheel wear compensation.

Tractive effort adjust factors are computed for the respective propulsion/braking units from the actual wheel size, the base wheel sizes and the axle speeds. Means are provided for applying the tractive effort adjustment factors to the propulsion/braking control for computation of tractive effort with wheel wear compensation.

BRIEF DESCRIPTION OF THE DRAWINGS

FIG. 2 shows a schematic diagram for a propulsion and braking control system for the vehicle of FIG. 1;

FIG. 6 shows a functional block diagram illustrating the compensation of wheel wear in accordance with the invention.

DESCRIPTION OF THE PREFERRED EMBODIMENT

Figure 1:
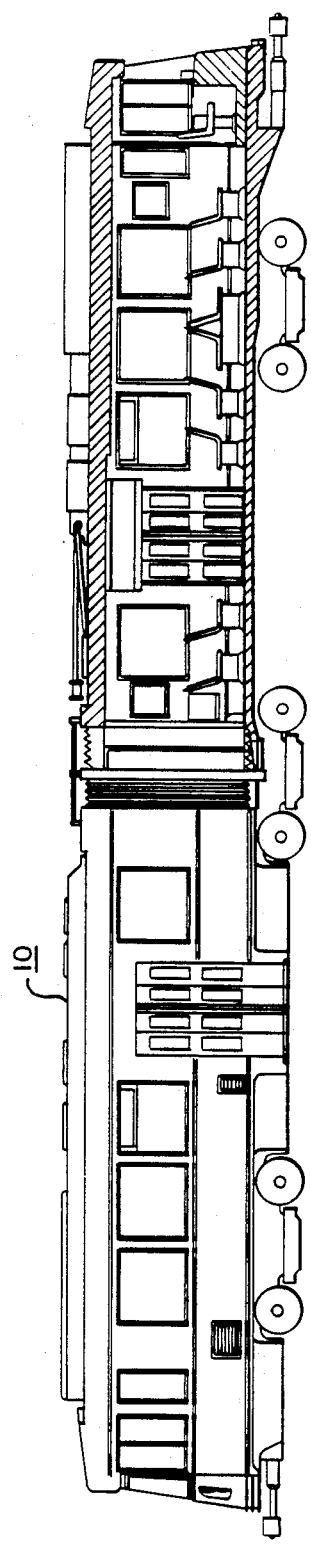
FIG. 1 shows an elevational view of a steel wheeled vehicle of a type used by the Boston Transit Authority having three trucks with each truck in turn having a pair of axles each with two steel wheels.

There is shown in FIG. 1 a steel wheeled transit vehicle 10 having a control system in which the present invention is implemented. The vehicle 10 is electrically operated and is representative of one type of vehicle currently used by the Boston Transit Authority in the Boston transit system.

The vehicle 10 is provided with two propulsion/braking trucks, A and B and one friction braking truck C, each of which carries two axles (designated as A1 through A6) with two steel wheels W at opposite ends of each axle. The wear surface on the rim of a steel wheel normally has a relatively long life, i.e. the wheel diameter typically can be reduced by wear by as much as two inches or more before the wheel is considered expended. With time in simultaneous use, the wheels can wear substantially equally or under various conditions they can wear differentially. In addition, differential wheel wear can exist where, for repair or maintenance reasons, wheels are interchanged among vehicles.

In operation, simultaneous equal wheel wear causes inaccurate tractive effort control in the absence of corrective adjustment. Differential wheel wear causes inaccuracy in tractive effort and spin/slide control in the absence of corrective adjustment. Wheel-wear control error basically results from the changing relationship between rotational axle speed and linear vehicle speed with decreasing wheel radius.

In FIG. 2, there is shown an overall propulsion and braking control system 18 for the transit vehicle 10. FIGS. 3A–3D show the control in greater block detail.

As shown in FIG. 2, respective foot controllers 20 and 22 are provided at opposite ends of the car to generate a P-signal for operator control. Operator generated P-signals are converted by the control logic electronics to control signals which are transmitted through respective control channels 24, 25, and 26 to apply propulsion or braking to the respective trucks 12, 14 and 16. The trucks 12 and 16 have propulsion capability; all of the trucks have braking capability.

Control logic 28, 29 and 30 is employed in each control channel to develop propulsion or braking signals. The control logic is preferably implemented in a programmed digital microprocessor system 31 which may have a single microprocessor for all three control channels or as one alternative a microprocessor for each control channel. Propulsion signals are applied to power electronics 32 and 34 in the front and rear control channels 24 and 26 which in turn develop tractive effort through motors and gears 36 and 38. In this case, a traction motor is provided for each axle and the two motors for each propulsion truck are series connected.

Friction braking signals are applied through interfaces 40, 41 and 42 to friction brakes 44, 45 and 46 in all of the respective control channels 24, 25 and 26.

As shown, the control logic elements 28, 29 and 30 are interfaced. Further external signals, including axle speed, friction brake and power electronics feedback signals, are applied to the control logic 28, 29 and 30.

PROPULSION/BRAKING CONTROL

Figure 3A:
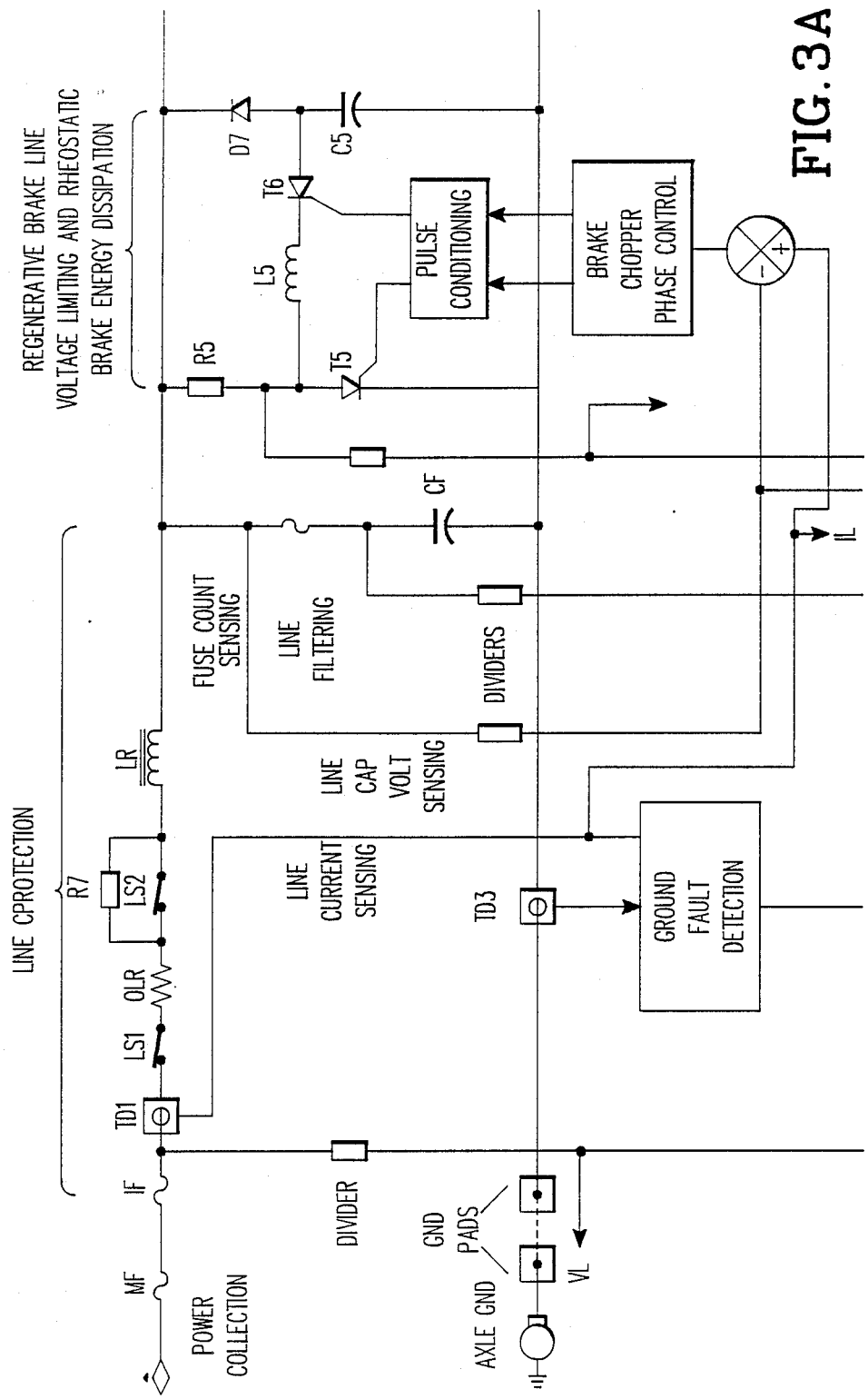
FIGS. 3A–3F show a more detailed functional block diagram of the propulsion/braking control loop.
Figure 3B:
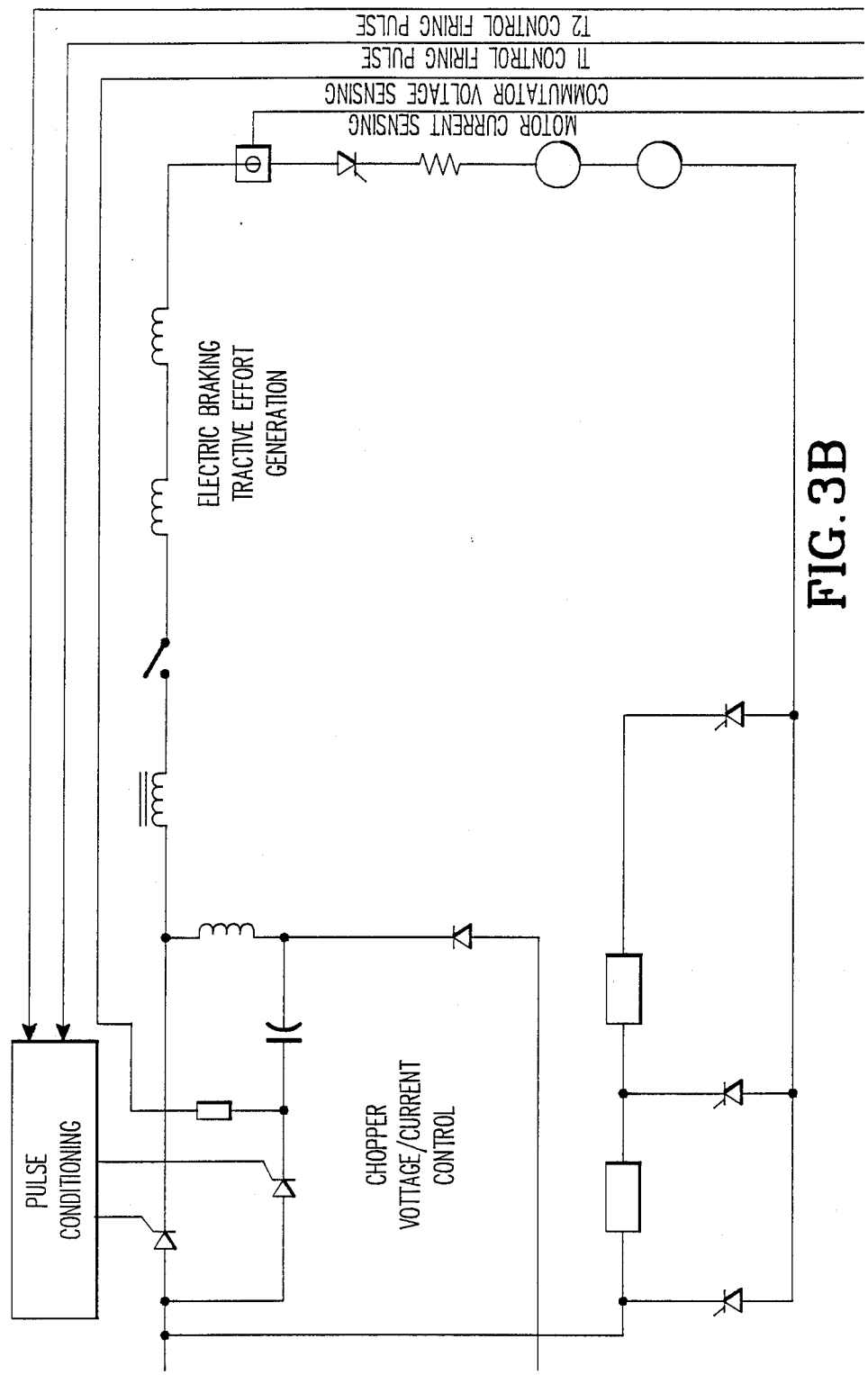
Figure 3C:
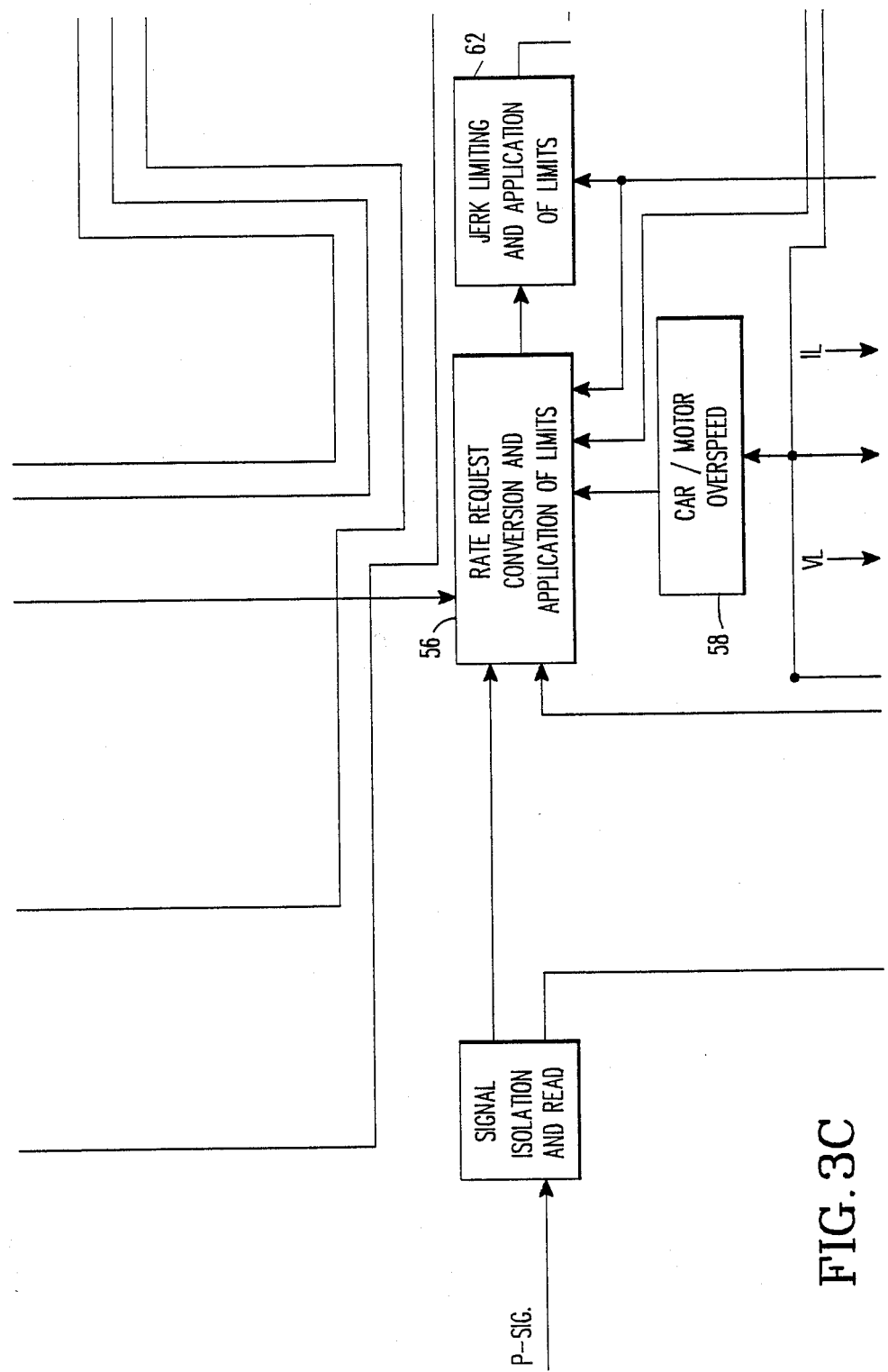
Figure 3D:
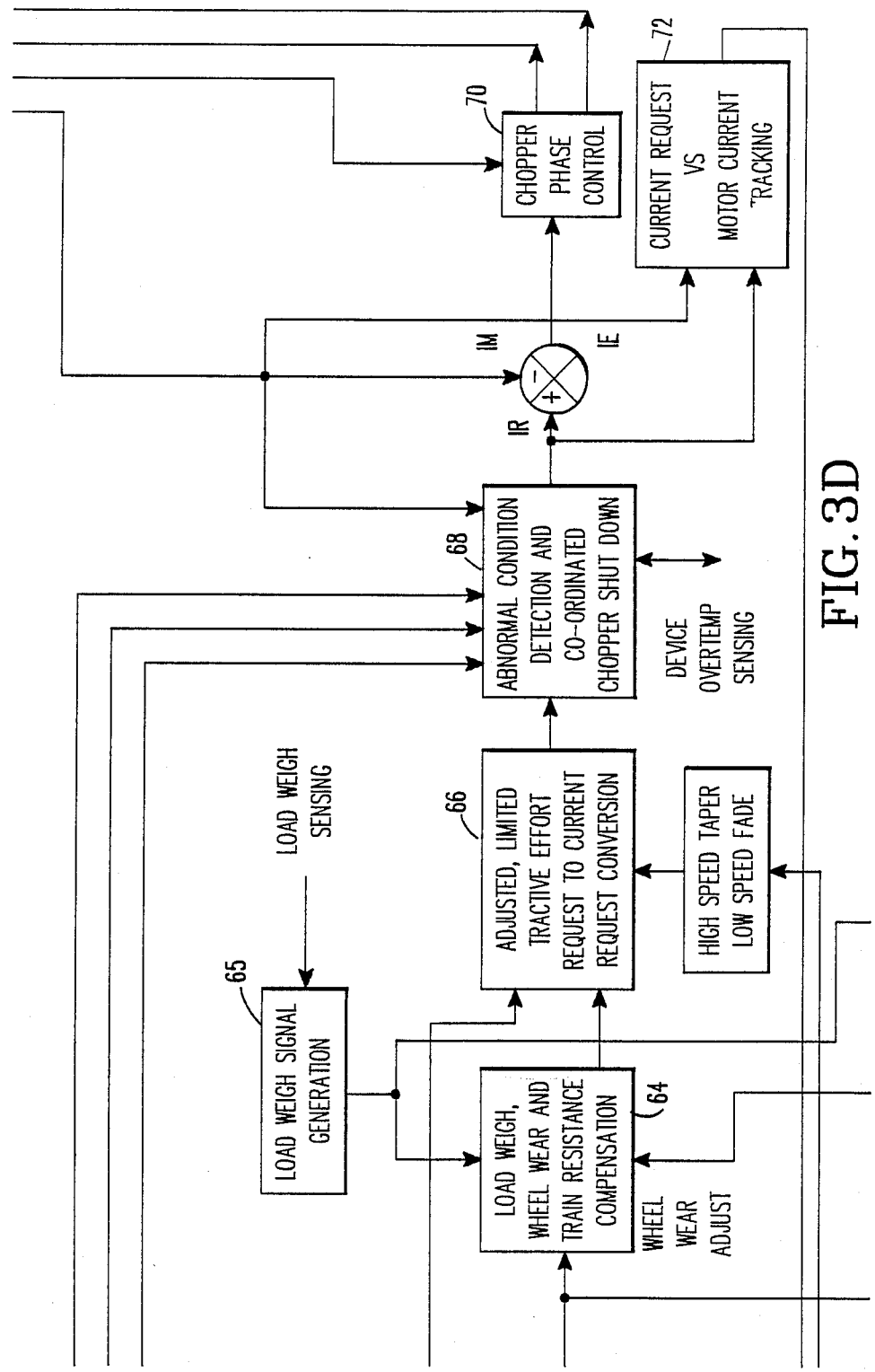
Figure 3E:
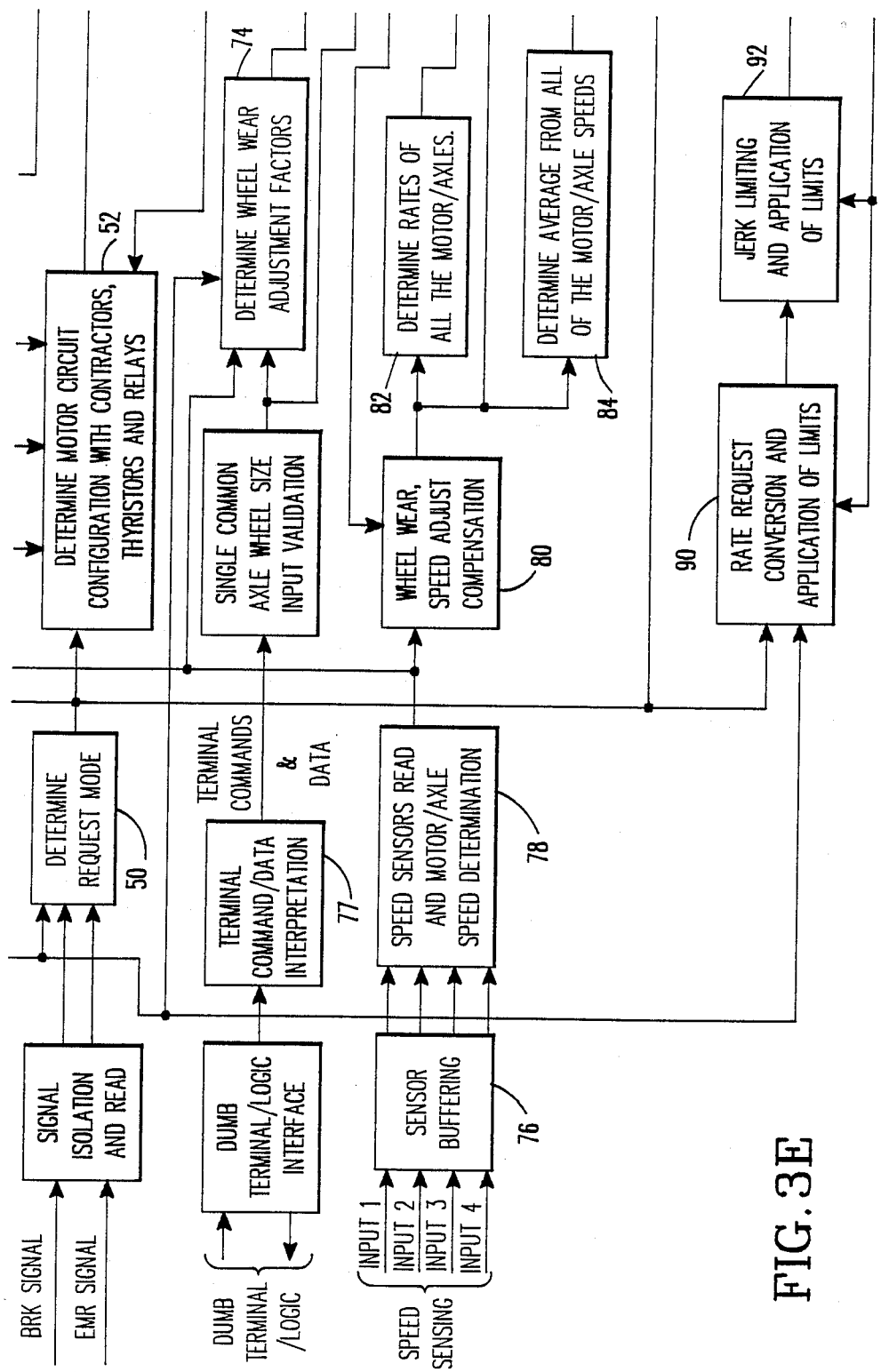
Figure 3F:
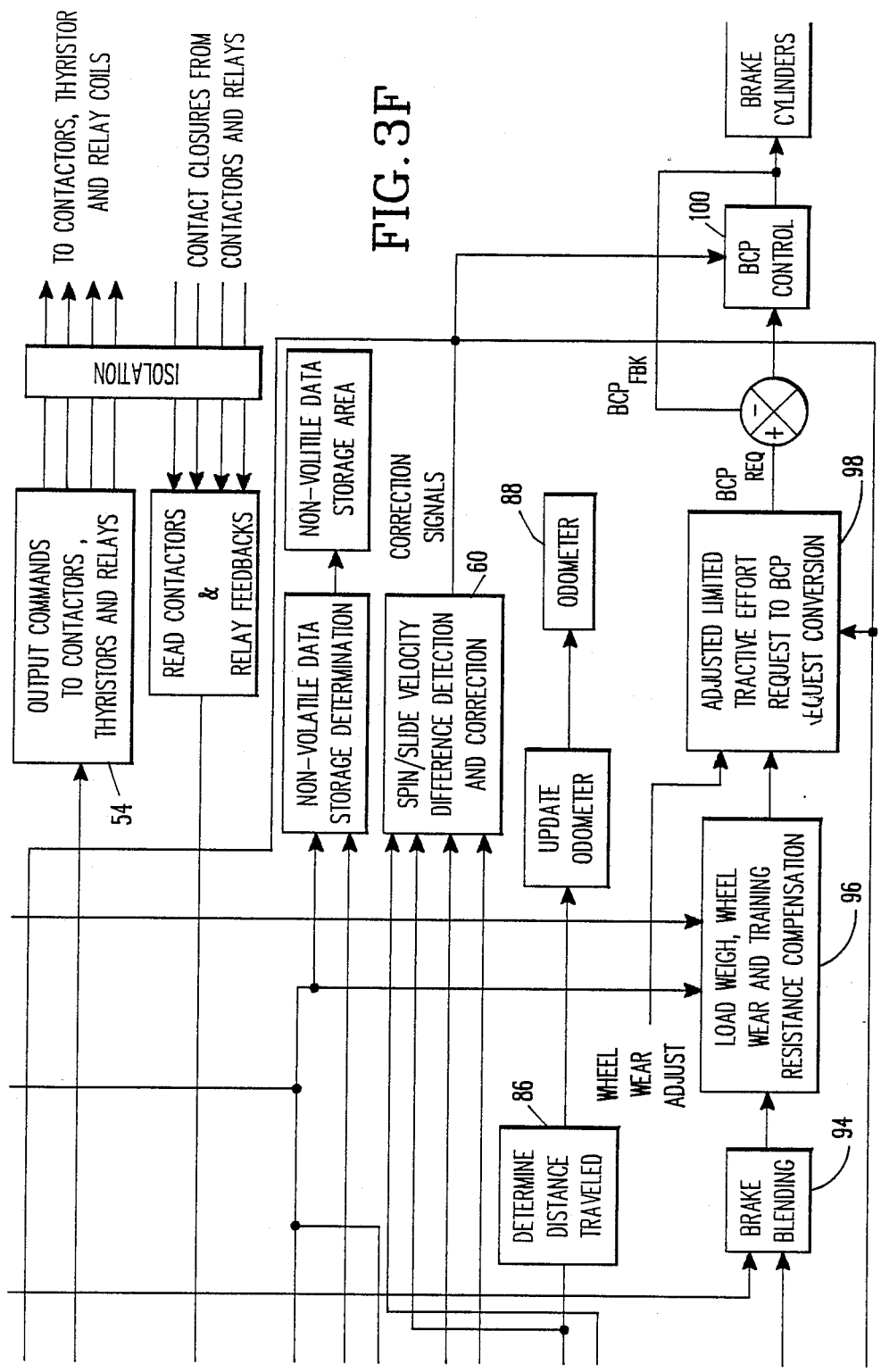

The propulsion/braking control loop for each truck is implemented in this embodiment with hardware and software elements. FIGS. 3A–3C show the control loop in greater functional block detail as configured for each of the three control channels with wheel wear compensation implemented in accordance with the invention.

In the control loop, block 50 determines whether a tractive effort request is a propulsion or a braking request based on the state of input logic signals P, BRK and EMR. Block 52 accordingly determines the needed motor circuit configuration and generates output commands for the connections to be made for contactors, thyristors and relay coils.

Block 56 calculates the requested rate in mph/sec from the mode and P-signal request, subject to limit conditions including car and motor overspeed 58 and spin/slide 60. Block 62 essentially provides for ramping a step request in order to avoid jerking of the car.

In computing requested tractive effort in pounds force, compensation is applied by block 64. Thus, the conventional compensations are applied for the load carried by the car (based on sensed load from block 65) and for train resistance.

In accordance with the invention, the tractive effort request is also compensated at this point in this embodiment for wheel wear. The wheel wear compensation is accurately computed on the basis of a tractive effort adjustment factor preferably computed in block 74 from a single actual wheel size entry made through terminal block 76. Thus, when a new measurement has been taken on a preselected axle, the size is entered manually through input terminal block 76.

After compensation, the adjusted tractive effort is converted to a traction motor current request in block 66 based on line voltage and raw axle speed. Fault detector block 68 determines whether any abnormal conditions such as motor overtemperature require shutdown and if so it stops implementation of the rate request. Otherwise, the current request from block 66 is applied to external hardware comprising a chopper control 70 which applies the requested drive current to the traction motor(s) under closed loop control. Block 72 tracks the drive current request and the actual motor current and applies the difference to the rate request block 56.

Axle speed signals are applied as inputs to a buffer 76 from which raw speed calculations are made by block 78. Block 80 operates in accordance with the invention to compensate the raw speed calculations in accordance with a wheel wear speed adjustment factor generated by block 74. The wheel wear adjusted speeds are employed to achieve more accurate spin/slide control and more accurate linear speed monitoring and control.

Block 82 calculates the rates for all the axles from the wheel wear adjusted axle speeds. Block 84 computes an average speed from all of the compensated axle speeds. In spin/slide control operation, the block 60 applies any required correction to the rate request block 56 on the basis of mode, wheel wear adjusted axle speeds and rates, and the wheel wear adjusted average axle or reference car speed.

In a monitoring channel, block 86 computes the distance traveled from the wheel wear adjusted car speed. Odometer 88 is thus accurately updated on a continuing basis.

In the development of friction braking effort, blocks 90 and 92 determine the total requested braking effort subject to limits including any spin/slide limit from the block 60. In block 94, brake effort blending is executed in accordance with the desired proportioning of dynamic electric and friction braking at different speed levels. Typically, only electric braking is applied at higher speeds and friction braking is gradually blended with electric braking as speed decreases until at about 5 mph and lower only friction braking is used. Accordingly, the block 94 subtracts the jerk limited electric braking from the total braking request to determine the friction braking level.

Block 96 compensates the friction braking request in accordance with actual load and train resistance and wheel wear in a manner similar to that described for the tractive effort compensation block 64. Brake cylinder pressure needed for the compensated friction brake request is computed in block 98 and applied to an external brake cylinder pressure control 100 for implementation.

PROGRAMMED OPERATION OF WHEEL-WEAR COMPENSATED CONTROL

Figure 4:
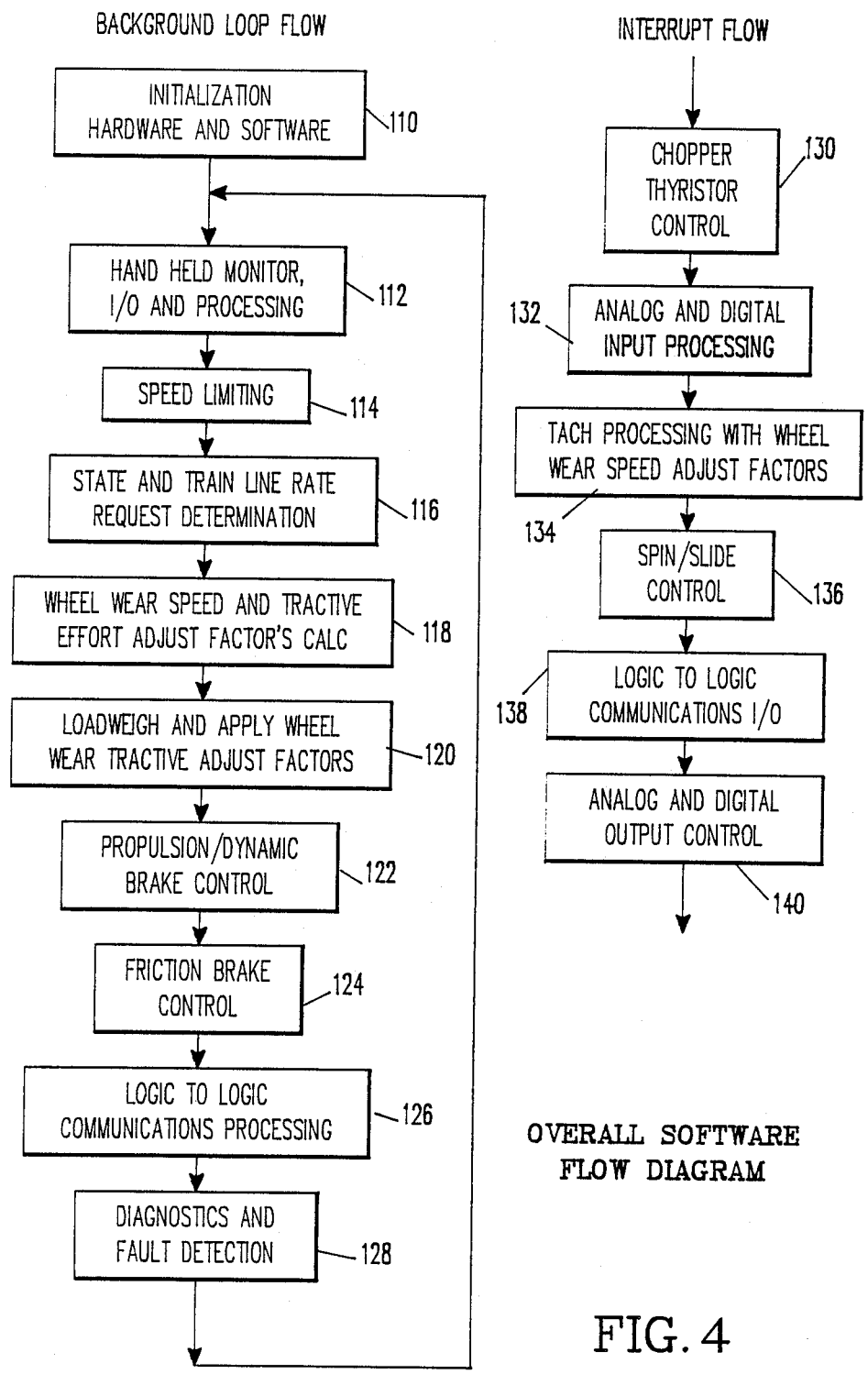
FIG. 4 shows an overall diagram of software executed in the control loop of FIG. 3.

The software organization for the propulsion/braking control is shown in FIG. 4. In background loop operation, initialization is performed by block 110 on startup. Successive blocks in the background loop perform functions as follows:

112 monitor input/output processing for block 77
114 speed limiting for block 58
116 determine rate and state requests for blocks 50, 52, 56, 90
118 calculation of wheel wear speed and traction effort adjustment factors in block 74

120 calculate tractive effort compensation for wheel wear, load and train resistance in block 64 and 96

122 calculations for propulsion/dynamic brake control in blocks 66 and 68

124 calculations for friction brake control in blocks 94, 98

126 process data for cross-channel logic-to-logic communications 128 diagnostic routines - including ground fault detection Control calculations are made and outputted every 5 milliseconds on an interrupt basis. Thus, block 130 generates chopper control outputs and block 132 processes analog and digital inputs. Block 134 provides tachometer signal processing with wheel wear speed adjustment factors per blocks 78 and 80. Block 136 makes spin/slide control calculations per blocks 60, 82 and 86. Logic-to-logic input/output communications are executed by block 138 and analog and digital control outputs are executed by block 140.

Figure 5A:
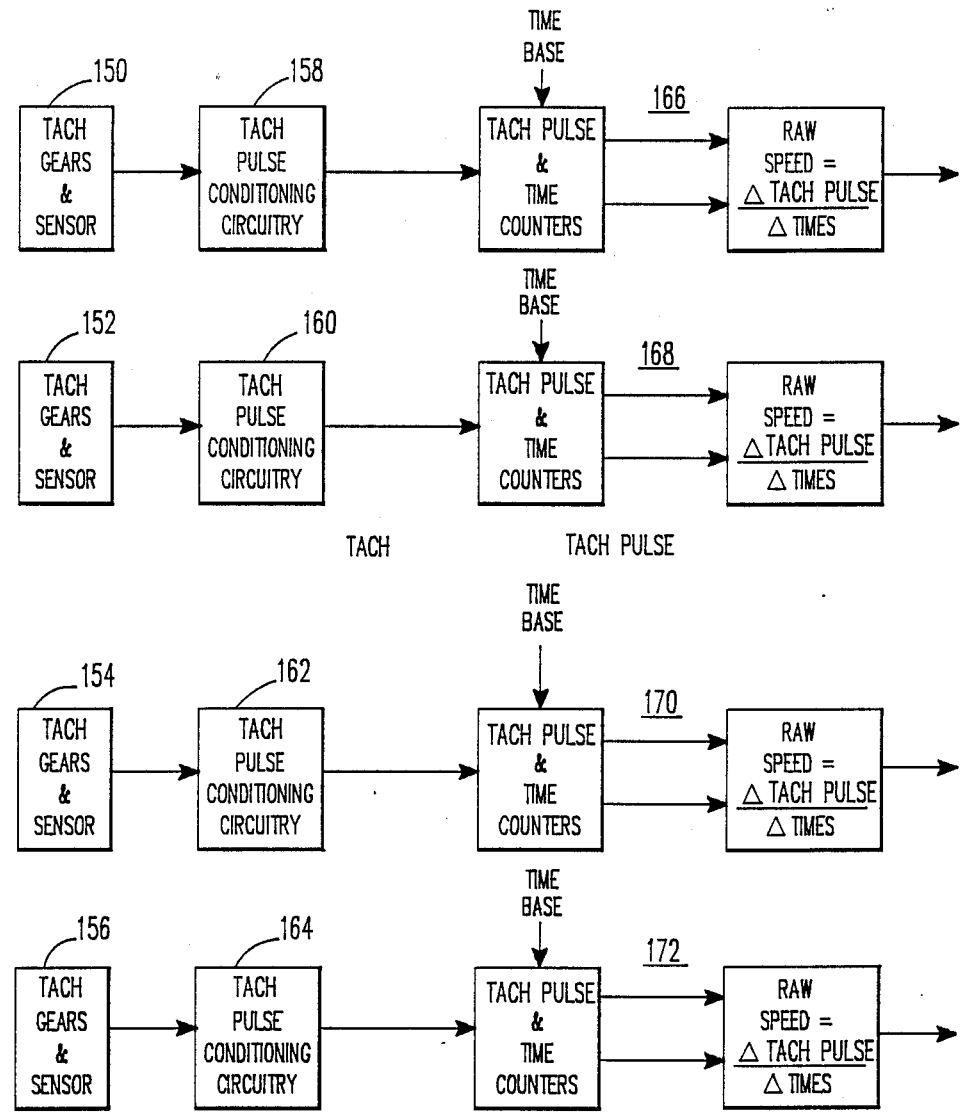
FIGS. 5 $a,b$ shows a more detailed functional block diagram illustrating the processing of tachometer speed signals in the control loop of FIG. 3.
Figure 5B:
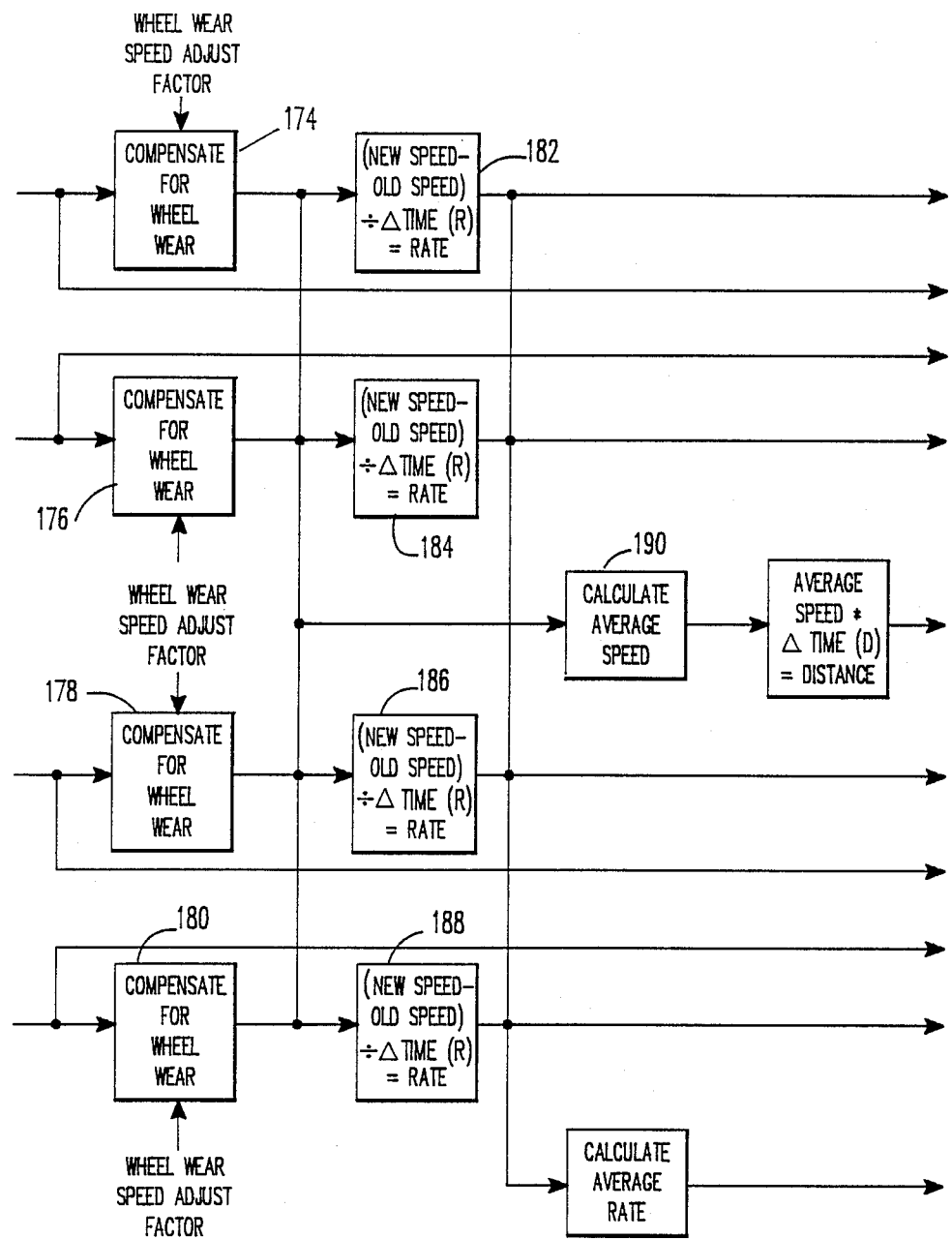

The calculation of axle speeds in block 134 for use in tractive effort and spin/slide control and speed monitoring is shown in greater detail in FIG. 5. The respective axles are provided with respective tachometers 150, 152, 154 and 156 that generate speed signals processed through respective conditioning circuits 158, 160, 162 and 164.

Raw speed is calculated in the respective speed channels by blocks 166, 168, 170 and 172. The tachometer pulse signals and real time are counted, and the raw speed is computed by dividing pulse count change by time count change.

The raw speeds are next compensated for wheel wear in respective blocks 174, 176, 178 and 180. The wheel wear compensated speed is computed in each speed channel for the raw speed and the corresponding wheel wear speed adjust factor.

The axle rate is next computed in blocks 182, 184, 186 and 188 in the respective speed channels by dividing speed change by time change over the count period.

For monitoring purposes, block 190 calculates the average of the four compensated channel speeds. In block 191, travelled distance is computed as the product of the average speed and the time change over the count period and provided as an output to the car odometer.

SPEED ADJUSTMENT FACTORS

In implementing the principles of the invention, the preferred embodiment employs a reference or "fifth" wheel concept to adjust axle speeds and tractive efforts as a function of wheel size. In this manner, the operator need only measure the size of two wheels (one axle) on a car and enter the average of the two measured sizes into the controller. By enabling wheel wear adjustment to be achieved with entry of only one wheel size, the risk of operator error is greatly reduced.

With multiple controllers, the controller that receives the input from the operator sends the input to the other controllers subject to at least one speed signal being common to all of the controllers. Each controller uses the entered wheel size to create a fifth wheel speed which is ratioed to sampled axle speed to compute the speed adjustment factors. Accordingly, the speed adjustment factors are proportional to wheel size and the adjusted axle speeds are the vehicle speed. Since the speed adjustment factors are proportional to wheel size, they are used to adjust correctively the tractive effort applied to the axles.

The following calculations are employed:

5TH AXLE SPEED=SPEED OF AXLE FOR WHICH WHEEL SIZE IS INPUT * WHEEL SIZE INPUT/BASE WHEEL SIZE where base wheel size is usually the unworn wheel size and wheel size input is less than or equal to the base wheel size.

SPEED ADJUST FACTOR FOR AXLE FOR WHICH WHEEL SIZE IS INPUT =WHEEL SIZE INPUT/BASE WHEEL SIZE

SPEED ADJUST FACTOR FOR OTHER AXLES=5TH AXLE SPEED/SAMPLED AXLE SPEED

TRACTIVE EFFORT ADJUST FACTOR FOR EACH TRUCK=AVERAGE OF SPEED ADJUST FACTORS FOR THE 2 AXLES ON THE TRUCK

The sample speed is the minimum speed at which speed sampling is done. In this specific case, the sample speed is about 25 MPH.

Figure 7:
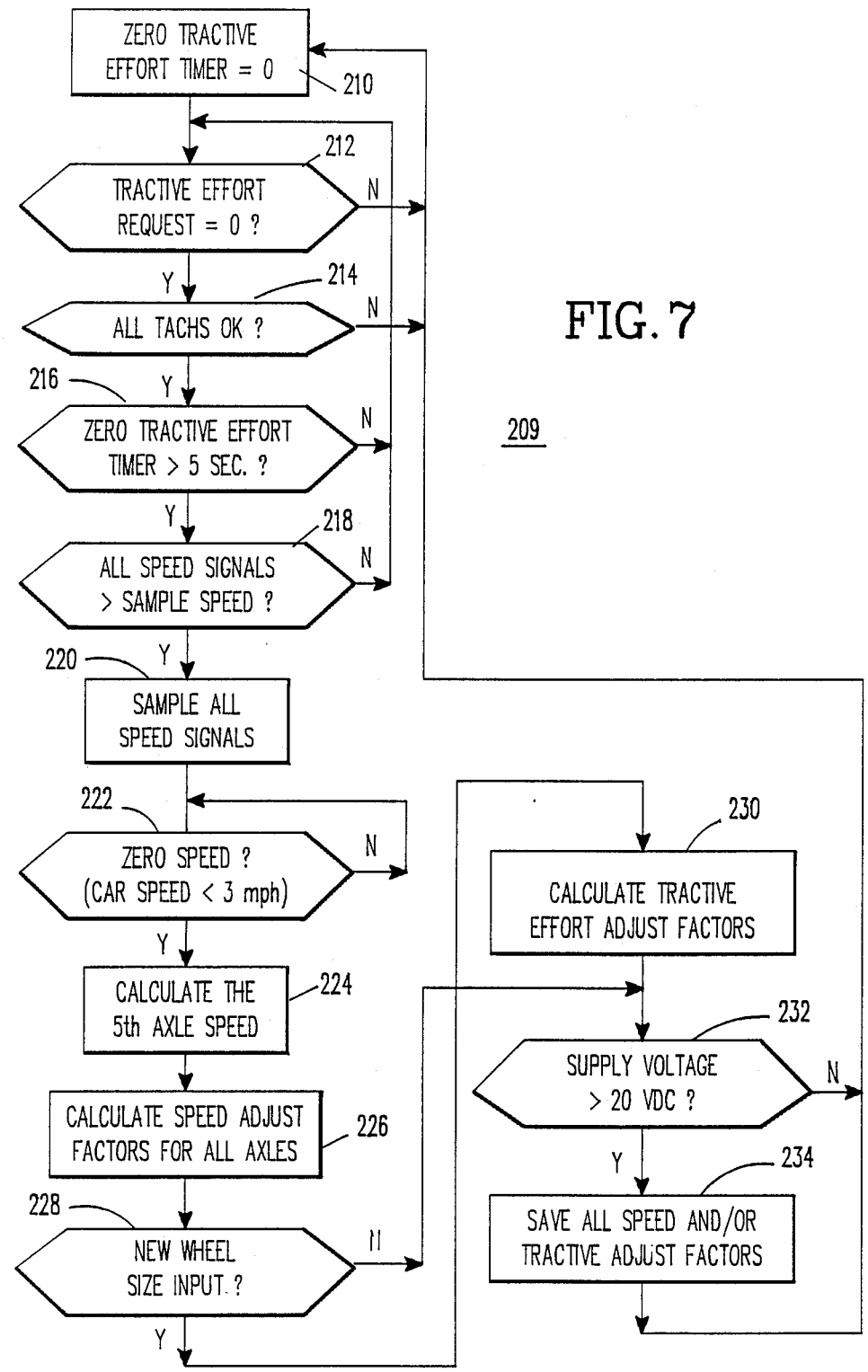
FIG. 7 shows a flow chart for wheel wear compensation programming.

The organization of the wheel wear adjustment software is shown in FIG. 6. Flow chart detail is shown in FIG. 7.

As shown, four raw axle speeds are applied in each of the three logic systems to sample and hold function blocks 192, 194, 196 and 198. The control logic 28 for the end truck A has speed signals for axles A1, A2, A3 and A4 applied to it. Speed signals for axles A3, A4, A5 and A6 are applied to the control logic 30 for end truck B. Speed signals for axles A2, A3, A4 and A5 are applied to the control logic 29 for middle truck C.

The average size of two wheels on a predetermined axle is applied as an input to block 200. Blocks 200, 202, 204 and 206 determine the speed adjustment factor for the respective speed channels. Block 200 determines the "fifth" wheel speed which is used in computing the speed adjustment factors for the axles other than the axle for which a new wheel size has been input. Block 208 computes a tractive effort wheel wear adjustment factor as the average of the adjustment factors for channels one and two.

In the periodic execution of a routine 209 (FIG. 7) employed to determine the speed and tractive effort adjustment factors, block 210 first sets a tractive effort timer to zero. With elapsed time measurement, a basis is laid for assuring that brake cylinder pressures and motor currents have dropped to zero, i.e. that the car is coasting with transients settled out of the system, before speeds are sampled and speed adjustment factors are calculated.

Next, block 212 checks the current tractive effort request to determine whether it is zero signifying a car coasting condition. If tractive effort is not zero, the routine continues to recycle through the timer reset block 210 until zero tractive effort is detected as existing.

After zero tractive effort detection, block 214 checks the validity of all tachometer systems. Invalidity results in recycling through the timer reset block 210.

With tachometer validation, block 216 reads the zero tractive effort timer and if elapsed time from zero reset is 5 seconds or less, recycling occurs through the block 212. Such recycling permits system settling as previously noted. The five second time is a function of system response and can be adjusted accordingly.

Once the settling time period has elapsed, block 218 compares all input speed signals (i.e. those speed inputs for the control logic being executed) to a minimum speed at which speed samples are permitted to be taken for calculation of speed and tractive effort adjustment factors. The minimum speed is set to provide assurance that the error effect of mechanical errors in the speed feedback system is acceptably low. The error effect from such errors generally decreases with increasing speed. However, the minimum speed for sampling is preferably set low enough to assure that adjustment factors are recalculated with reasonable frequency during car use. In other words, an excessively high minimum sampling speed is preferably avoided since the car may not reach that speed in operation frequently enough to satisfy the need for reasonably frequent updating of the adjustment factors. In effect, the sampling accuracy gained by using higher sampling speeds must be balanced against the accuracy lost by decreasing the frequency with which speed samplings are made because of a higher minimum sampling speed. In the present case, the maximum permitted car speed is 50 MPH, and as already indicated, the minimum sampling speed is preferably about 25 MPH.

When all axle speed signals exceed the minimum sampling speed, block 220 records as samples all of the input axle speed signals.

Next, block 222 senses whether the car speed is essentially at zero value to permit implementation of new adjustment factors to be calculated from the near sample speeds. In this case, a car speed less than 3 MPH is considered zero speed.

If the car speed exceeds 3 MPH, local block recycling continues until it is determined that the car has essentially been brought to rest by the operator during normal car operation. Adjustment factor recalculation is then permitted. In this manner, there are avoided sudden changes in car velocity that could otherwise occur with the implementation of recalculated adjustment factors while the car is moving at higher speeds.

When the car is essentially at rest, the adjustment factor calculations are begun in block 224. Specifically, a reference sample car speed called the "fifth" axle car speed is calculated by multiplying the sample car speed (block 220) for the axle for which the new wheel size was input against the ratio of the new wheel size to the base (original) wheel size. Car speed for an axle is defined as the actual axle speed multiplied against the wheel diameter and against a constant K for converting revolution per minute and inch dimensions to miles per hour.

Typically, the dimension used for size can be the diameter of the wheel. Further, since the two wheels on an axle are interlocked, it is preferred that the size or diameter of both wheels be measured and averaged in providing the input wheel size.

Block 226 calculates the speed adjustment factors (SAF) for all axles. The SAF for the axle for which the new wheel size was entered is equal to the ratio of the new wheel size to the base (original) wheel size. The SAF for all other axles is calculated by ratioing the "fifth" axle speed to the sampled speed for the axle being calculated. All initialization for tachometer circuitry and processing is based on the base wheel size (diameter). Tachometer system outputs thus are inaccurate as the wheels wear and correct actual axle speed is obtained by multiplying the tachometer indicated speed against the ratio of the new wheel diameter to the base wheel diameter.

Generally, the SAF decreases as sampled speed increases with wear. Further, the SAFs for all the axles will decrease differentially with differing amounts of wheel wear.

If block 228 indicates that a new wheel size has been input for the current cycle of the routine 209, block 230 calculates the tractive effort adjustment factor for the truck handled by the control logic 28 or 29 or 30 being executed. The tractive effort adjustment factor (for propulsion or braking) is preferably made equal to the average of the speed adjustment factors for the two axles on the truck for which calculations are being made.

Generally the amount of tractive effort needed to accelerate or decelerate the car at a given rate decreases with wheel wear. Preferably, the tractive effort adjustment factor is recalculated only when a new wheel size is entered. In this manner, more tractive effort than is required may be requested as wheel wear progresses after a new wheel size has been entered. However, implementation of less than requested tractive effort is avoided as might otherwise occur if the tractive effort adjustment factor is updated on an ongoing basis from speed adjustment factor updatings in box 226. Thus, it is desirable that new wheel size values be entered to keep the control system tuned in its accuracy of operation to the actual progress of wheel wear. Accurate system operation can thus be conveniently achieved since the system requires only a single wheel size entry without error proneness.

Once the tractive effort adjustment calculations are made after a new wheel size entry, these calculations are not made again during cycling of the routine 209 until the next wheel size input is made. This is because the tractive effort adjustment factor is preferably updated only on the basis of current absolute wheel size as previously indicated.

After execution of the block 228 or 230 is each execution of the routine 209, block 232 checks the battery voltage to make sure that logic power is adequate to enable all of the adjustment factors to be stored in battery RAM. Block 234 then stores the new adjustment factors and the routine 209 recycles through the block 210.

Continued recycling of the routine 209 in the time period between wheel size inputs results in recalculation of car speed adjustment factors in block 226. As the wheels continue to wear, relative adjustments are made in the speed adjustment factors for differential amounts of wear among the wheels. Thus, the fifth axle car speed continues to be calculated from the next previous wheel size input, and each axle speed adjustment factor is the ratio of the current fifth axle car speed to the current axle car speed thereby enabling different adjustments for different wheel wears. Accordingly, even in the absence of an external wheel size input, the disclosed system performs at least as well as the prior art.

What is claimed is:

1. A control system for a steel wheel vehicle having at least two propulsion/braking units with each operating at least one axle, said system comprising:
   a propulsion/braking control generating current signals to operate the axle motor drives and generating braking signals to operate the associated braking system in accordance with command signals;

a spin/slide control for adjusting said propulsion/braking control in accordance with differential axle speeds to avoid vehicular spins/slides;

means for generating a signal representative of the speed of each axle;

means for generating a signal representative of an entered actual wheel size for a preselected one of said axles;

means for computing speed adjust factors, for the respective axles from the entered actual wheel size, the base wheel sizes and the axle speeds;

means for adjusting the respective axle speeds in accordance with the speed adjust factors and for applying the adjusted axle speeds to said spin/slide control for computation of differential axle speeds with wheel wear compensation;

means for computing tractive effort adjust factors for the respective propulsion/braking units from the actual wheel size, the base wheel sizes and the axle speeds; and means for applying the tractive effort adjustment factors to said propulsion/braking control for computation and execution of tractive effort with wheel wear compensation.

2. A control system for a steel wheel vehicle having at least two propulsion/braking units with each operating at least one axle, said system comprising:

a propulsion/braking control generating current signals to operate the axle motor drives and generating braking signals to operate the associated braking system in accordance with command signals;

a spin/slide control for adjusting said propulsion/braking control in accordance with differential axle speeds to avoid vehicular spins/slides;

means for generating a signal representative of the speed of each axle;

means for generating a signal representative of an entered actual wheel size for a preselected one of said axles;

means for computing speed adjust factors for the respective axles from the entered actual wheel size, the base wheel sizes and the axle speeds; and means for adjusting the respective axle speeds in accordance with the speed adjust factors and for generating an indication of the wheel wear compensated vehicle speed from the adjusted axle speeds and for generating an indication of distance travelled from the calculated vehicle speed.

3. A control system for a steel wheel vehicle having at least two propulsion/braking units with each operative with at least one axle, said system comprising:

a propulsion/braking control generating current signals to operate the axle motor drives and generating braking signals to operate the associated braking system in accordance with command signals;

a spin/slide control for adjusting said propulsion/braking control in accordance with differential axle speeds to avoid vehicular spins/slides;

means for generating a signal representative of the speed of each axle;

means for generating a signal representative of an entered actual wheel size for a preselected one of said axles;

means for computing speed adjust factors for the respective axles from the entered actual wheel size, the base wheel sizes and the axle speeds;

means for adjusting the respective axle speeds in accordance with the speed adjust factors and for applying the adjusted axle speeds to said spin/slide control for computation of differential axle speeds with wheel wear compensation;

means for generating an indication of the wheel wear compensated vehicle speed from the adjusted axle speeds and for generating an indication of distance travelled from the calculated vehicle speed;

means for computing tractive effort adjust factors for the respective propulsion/braking units from the actual wheel size, the base wheel sizes and the axle speeds; and means for applying the tractive effort adjustment factors to said propulsion/braking control for computation and execution of tractive effort with wheel wear compensation.

4. A train control as set forth in claim 1 wherein the speed adjust factors are computed cyclically and the tractive effort adjust factor is computed once after each new wheel size is input.

5. A train control as set forth in claim 1 wherein the car speed must be at or near zero speed for the adjust factors to be calculated and implemented.

6. A train control as set forth in claim 1 wherein a reference axle speed is computed from the product of the axle speed for which the wheel size is input and the ratio of the wheel size input to the original wheel size, the speed adjust factor for the axle for which the wheel size is input is computed as the ratio of the wheel size input to the original wheel size, the speed adjust factor for other axles is computed as the ratio of the reference axle speed to the measured axle speed, and the tractive effort adjust factor for each propulsion/braking unit is a function of the speed adjust factor or factors for the axle or axles associated with the unit.

7. A train control as set forth in claim 6 wherein each propulsion/braking unit is associated with two axles and the tractive effort adjust factor for each unit is the average of the speed adjust factors for the two axles for that input.

8. A train control as set forth in claim 1 wherein a microprocessor is employed as a substantial part of said propulsion/braking and spin/slide controls and is operated to make the adjust factor computations.

9. A train control as set forth in claim 1 wherein the wheel size for the selected axle is the average wheel size for the two wheels on the axle.

10. A train control as set forth in claim 2 wherein the travelled vehicle distance is computed from vehicle speed derived as the average of the wheel wear compensated axle speeds.

11. A train control as set forth in claim 3 wherein the speed adjust factors are computed cyclically and the tractive effort adjust factor is computed once after each new wheel size is input.

12. A train control as set forth in claim 5 wherein the speed adjust factors are computed cyclically and the tractive effort adjust factor is computed once after each new wheel size is input.

13. A train control as set forth in claim 6 wherein the speed adjust factors are computed cyclically and the tractive effort adjust factor is computed once after each new wheel size is input.

14. A train control as set forth in claim 7 wherein the speed adjust factors are computed cyclically and the tractive effort adjust factor is computed once after each new wheel size is input.

15. A train control as set forth in claim 8 wherein the speed adjust factors are computed cyclically and the tractive effort adjust factor is computed once after each new wheel size is input.

16. A train control as set forth in claim 9 wherein the speed adjust factors are computed cyclically and the tractive effort adjust factor is computed once after each new wheel size is input.

* * * * *